| United States Patent [19] | [11] Patent Number: 4,713,230 |
|---|---|
| Doornbos | [45] Date of Patent: Dec. 15, 1987 |

[54] PURIFICATION OF CHLOROSILANES

[75] Inventor: Richard S. Doornbos, Midland, Mich.

[73] Assignee: Dow Corning Corporation, Midland, Mich.

[21] Appl. No.: 640,226

[22] Filed: Aug. 13, 1984

Related U.S. Application Data

[63] Continuation of Ser. No. 427,082, Sep. 29, 1982, abandoned.

[51] Int. Cl.$^4$ ..................... C01B 33/08; C01B 33/107
[52] U.S. Cl. ...................................... 423/341; 423/342
[58] Field of Search ................................ 423/341, 342

[56] References Cited

U.S. PATENT DOCUMENTS

| 2,820,698 | 1/1958 | Krchma | 423/341 |
| 2,877,097 | 3/1959 | Wolff | 23/205 |
| 3,071,444 | 1/1963 | Theuerer | 23/223.5 |
| 3,252,752 | 5/1966 | Pohl et al. | 423/342 |
| 3,414,603 | 12/1968 | Mlavsky | 260/448.2 |
| 3,540,861 | 11/1970 | Bradley et al. | 23/366 |
| 4,112,057 | 9/1978 | Lang et al. | 423/342 |

FOREIGN PATENT DOCUMENTS 1134973  8/1962  Fed. Rep. of Germany ...... 423/341

*Primary Examiner*—Jack Cooper
*Attorney, Agent, or Firm*—Robert L. McKellar

[57] ABSTRACT

Chlorosilanes contaminated with boron-containing impurities can be purified by passing the chlorosilane vapor through a silica fixed bed. Normally the boron level in trichlorosilane is reduced by about 90-99+% by the use of this process. The capacities of the silica columns for the purification of trichlorosilane generally are in the range of 1500-2000 pounds trichlorosilane per pound of silica. The purified chlorosilane is particularly well suited for the production of polycrystalline silicon. Polycrystalline silicon containing 0.03 ppba (parts per billion atomic) has been prepared from trichlorosilane purified with this process.

20 Claims, No Drawings

PURIFICATION OF CHLOROSILANES

This is a continuation of co-pending application Ser. No. 427,082 filed on Sept. 29, 1982, now abandoned.

BACKGROUND OF INVENTION

The production of polycrystalline silicon for use in semiconductor devices is normally effected by the hydrogen reduction of various chlorosilanes at elevated temperatures. Because of the stringent impurity limitations for semiconductor silicon, the starting materials should be of the highest possible purity. Boron impurities in semiconductor silicon are generally the most troublesome since boron in silicon has a distribution coefficient approaching unity and therefore cannot normally be removed from silicon metal by conventional zone-refining techniques. Unfortunately, the boron-containing impurities are also difficult to remove from chlorosilanes.

There have been numerous attempts in the art to purify chlorosilanes in order to produce better quality semiconductor silicon. These purification techniques include, for example, repetitive distillation, water treatment (see for example U.S. Pat. No. 3,540,861 issued Nov. 17, 1970), and the use of adsorbants to remove the boron-containing and, possibly, other impurities. U.S. Pat. No. 4,112,057 (issued Sept. 5, 1978) teaches that chlorosilanes contaminated by boron-containing impurities can be purified by treatment of the liquid chlorosilane with an effective amount of a hydrated metal oxide or a hydrated silicate containing 3 to 8% by weight water and then distilling the treated chlorosilane at a temperature of about 3° to 15° C. above its boiling point at atmospheric pressure. Water is required to be added periodically to the adsorbant of U.S. Pat. No. 4,112,057 to keep the water content in the 3–8% range. Silica was employed as the adsorbant in this process but only liquid phase adsorption was disclosed in U.S. Pat. No. 4,112,057.

U.S. Pat. No. 3,071,444 (issued Jan. 1, 1963) teaches that chlorosilanes can be purified by passage of the liquid chlorosilane through a bed of various adsorbents including silica. For the silica to be effective, however, it was necessary to preactivate the material at about 270° C. or more in air for extended periods of time. Additionally, long contact times between the chlorosilane and the adsorbent were used. U.S. Pat. No. 3,071,444 did not disclose the purification of chlorosilanes by passage of the chlorosilane in the vapor phase through any of the disclosed adsorbents.

Adsorption techniques employing ion-exchange resins have also been used to purify chlorosilanes (U.S. Pat. No. 2,877,097 issued Mar. 10, 1959) as well as organochlorosilanes (U.S. Pat. No. 3,414,603 issued Dec. 3, 1968). Both patents teach that adsorption of impurities (including boron) from the chlorosilanes by passage through ion-exchange resins was independent of the state (liquid or vapor phase) of the chlorosilanes. In other words, U.S. Pat. Nos. 2,877,097 and 3,414,603 teach that liquid phase adsorption and vapor phase adsorption of impurities from various chlorosilanes using ion-exchange resins are equivalent processes.

One object of this present invention is to provide a process by which chlorosilanes can be more easily purified. Another object is to provide a process by which boron-containing impurities can be more easily removed from chlorosilanes. Still another object is to provide a process for providing trichlorosilane, substantially free of boron-containing impurities, which is suitable for use in the production of semiconductor silicon. Still other objects of the present invention will be apparent to those skilled in the art upon consideration of this specification.

SUMMARY OF THE INVENTION

This invention relates to a process for the purification of a chlorosilane selected from the group consisting of monochlorosilane, dichlorosilane, trichlorosilane, and tetrachlorosilane where said chlorosilane is contaminated with boron-containing impurities, said process comprising the steps of (A) passing the chlorosilane, in the vapor phase, through a bed of silica, said bed of silica being at a temperature greater than 3° C. above the boiling point of the chlorosilane at the operating pressure of step (A) and said silica containing more than about 0.25% by weight total hydroxyl, and (B) collecting the purified chlorosilane having a significantly reduced amount of the boron-containing impurities.

DETAILED DESCRIPTION

This invention relates to a process for the removal of boron-containing impurities from various chlorosilanes thereby rendering the chlorosilanes more suitable for the production of semiconductor silicon by the various known reduction techniques (especially the hydrogen reduction technique). The chlorosilane suitable for purification by this process include chlorosilanes of the general formula

$$Cl_nSiH_{4-n}$$

where n is 1, 2, 3, or 4. More specifically, these chlorosilanes include monochlorosilane, dichlorosilane, trichlorosilane, and tetrachlorosilane. Dichlorosilane and trichlorosilane are preferred species for the practice of this invention. Trichlorosilane produced in the so-called "direct process" reaction of silicon metal and hydrogen chloride is a particularly preferred species for the practice of this invention.

The process of this invention is carried out by passing the vaporous chlorosilane through a bed of silica, preferably a fixed bed of silica in an adsorption column or tower, where a significant amount of the boron-containing impurities are removed from the chlorosilane and then collecting the purified chlorosilane. In order to gain the advantages of this process the chlorosilane must be in the vapor state during the contact with the silica. The advantages of this process over the purification techniques of the prior art include, among others, improved capacity of the silica for removing the boron impurities, improved efficiency for boron removal, and decreased contact time between the silica and chlorosilane for boron removal. These advantages will be delineated in more detail in the examples.

The temperature of the silica bed must be such that the chlorosilane remains in the vapor phase. Therefore, the temperature of the silica gel bed should be above about 3° C. above the boiling point of the chlorosilane at the operating pressure of the silica bed. It has been found that the adsorption capacity and efficiency of the silica bed decreases when the temperature of the bed goes above about 85° C. Therefore it is preferred that the temperature of the silica bed remain below about 85° C. in order to obtain the maximum purification. When trichlorosilane is purified by the procedures of this invention it is especially preferred that the adsorption bed temperature is between about 50°-75° C.

The pressure of the adsorption column is not critical. However, as one skilled in the art understands, if one wishes to operate within the preferred temperature ranges, the pressure should not be so excessive that it is not possible to meet the temperature limitations described above. In other words, if one wishes to operate the silica bed in the preferred temperature range of greater than 3° C. above the boiling point of chlorosilane and below about 85° C. then the pressure of the adsorption column should be below that pressure required to raise the boiling point of the chlorosilane to be purified to a temperature of about 82° C. Otherwise, the pressure can be atmospheric or below or above atmospheric.

Types of silica useful in this invention includes silica gel, silica powder, fumed silica, amorphous silica, and precipitated silica. The silicas that have been employed in the practice of this invention were used as received from the manufacturer or supplier. The free water content of the silica was determined by weight loss at 105° C. for three hours in a forced air convection oven. The silicas tested had a free water content from about 0 to 6% by weight. The total hydroxyl content of the silica was determined by titration with lithium aluminum di-n-butylamide. This titration procedure is described in detail in *Analysis of Silicones*, A. L. Smith (Ed), John Wiley and Sons (1974), New York, pages 139-142 which is hereby incorporated by reference. This procedure determines both the water content and $\equiv$SiOH surface groups on the silica. The silica was not dried prior to the total hydroxyl determination. The total hydroxyl content was found to be in the range of about 1 to 3% (by weight) by the lithium aluminum di-n-butylamide titration for the samples tested. Performance of the vapor phase adsorption process for boron removal from chlorosilanes does appear to vary with total hydroxyl content of the silica. Except with the very low total hydroxyl containing silicas this performance variation is small. It is expected that silica containing less than about 0.25% by weight total hydroxyl would not be suitable for use in this invention. It is preferred that the silica contain at least 1.0% total hydroxyl for best performance. As one skilled in the art would know, there is a maximum limit on the free water content of the silica employed in this invention. This maximum limit results because of the possibility of hydrolysis of the chlorosilane. With excessive hydrolysis, caused by excessive water in the silica, the adsorption column may become plugged thereby restricting vapor flow through the column and causing an excessive pressure drop through the column. The use of such "wet" silicas should be avoided to obtain the maximum usefulness of this invention. Column plugging has not been observed in any of the experiments performed using the vapor phase adsorption technique to date. However, it is estimated that the free water content should be below about 10% by weight to minimize potential column plugging problems.

The silica's particle size and particle size distribution are also variables. The best silicas that have been examined to date have a particle size of 28-200 mesh with a particle size distribution such that about 35-65% of the particles of are retained on a 65 mesh screen. As the particle size decreases the pressure drop across the silica fixed bed increases. Silica bed columns with high pressure drops do work in the practice of this invention but require higher capital investment due to the larger pumps and other equipment required to overcome the pressure drop. With larger particle size silicas a decrease in efficiencies and capacities for purifying chlorosilanes is expected. For example a silica with a particle size of 12-28 mesh gave poorer results than did a 28-200 mesh material. The 12-28 mesh material had a capacity of about 500 g $HSiCl_3$/g $SiO_2$ and removed only about 63% of the boron as opposed to a capacity of 1500-2000 g $HSiCl_3$/g $SiO_2$ and removal of >90% of the boron with the 28-200 mesh silica. However, the performance of the larger particle size material is still superior in the vapor phase adsorption as compared to the liquid phase system.

All the silicas tested had large surface areas. It is estimated that silicas with surface areas greater than 100 $m^2$/g would be suitable for the practice of this invention. However, silicas with surface areas greater than 500 $m^2$/g are preferred.

The process of this invention is carried out by passing vaporous chlorosilanes through silica and collecting the purified chlorosilane effluent. Passage of the chlorosilane through silica results in an effluent which contains a significantly reduced amount of boron-containing impurities as compared to the crude chlorosilane feed. The meaning of "significantly reduced amount" is dependent on the boron content of the chlorosilane feed. When the chlorosilane feed contains more than about 500 ppba (parts per billion atomic) boron, a "significantly reduced amount" is understood to mean that at least 75% of the boron-containing impurities are removed from the chlorosilane feed. When the chlorosilane feed contains between 50 and 500 ppba boron a "significantly reduced amount" is understood to mean that at least 50% of the boron-containing impurities are removed from the chlorosilane feed. When the chlorosilane feed contains less than 50 ppba boron, a "significantly reduced amount" is understood to mean that at least 25% of the boron-containing impurities are removed from the chlorosilane feed by the practice of this invention. In most cases more than 90% of the boron-containing impurities are removed from the crude chlorosilane feed by passage of the vapor through suitable silica adsorption columns. The effluent streams of purified chlorosilanes usually contain less than 100 ppba boron and in many cases less than 50 ppba boron. The capacity of most of the silicas examined in the process of this invention was in the range of 1500-2000 lbs $HSiCl_3$/lb $SiO_2$. As the capacity of a silica column is approached the boron content in the effluent increases. When the boron content of the effluent reaches about 150 ppba boron the column is said to have reached the boron "breakthrough" level and is considered to be nearly exhausted. If more chlorosilane is passed through the column after "breakthrough" has been reached the boron content of the effluent will rapidly rise to high levels which will approach the level of boron in the feed chlorosilane. Naturally, this definition of "breakthrough" does not apply if one is attempting to purify a chlorosilane containing less than 150 ppba boron.

The process of this invention can be used alone to remove boron-containing impurities from chlorosilanes. The process can be run in a continuous, semi-continuous or batch mode as desired. This purification method can also be used in combination with other chlorosilane purification processes. For example, the process of this invention could be employed along with a repetitive distillation procedure of the prior art. The vapor phase adsorption column could be placed before the initial distillation column, between distillation columns, or after the final distillation column. The vapor phase adsorption technique could also be used in combination with water treatment with or without additional distillations. More than one silica column could be used in such purification processes. Indeed, one of the advantages of the process of this invention is the ease that it can be introduced into an existing chlorosilane purification process. One advantage of combining the instant process with other processes to purify chlorosilanes is that process upsets in any one part of the system are less likely to result in chlorosilanes which can not be used directly for polycrystalline silicon production. Upsets could occur in the vapor adsorption process (for example, a premature boron "breakthrough") or in the other part of the combined process. An additional advantage of combining the instant purification process with other purification processes is an improvement in the purified chlorosilane's quality. Again this combined purification system can be operated in a continuous, semi-continuous or batch mode.

The following examples are to illustrate the invention and are not to be regarded as limiting. Examples 1-5 and Comparative Examples 1-3 were conducted in small, laboratory scale equipment. Examples 6 and 7 demonstrate the practice of this invention using much larger scale equipment. In the examples the boron content of effluent chlorosilane was determined using the following analytical procedure. The analytical apparatus was constructed entirely of Teflon to minimize sample contamination and exposure of the samples to air. The analytical apparatus consisted of a sample container for the effluent to be tested which had an argon inlet tube and a dip tube extending to very close to the bottom of the sample container. The upper portion of the dip tube was connected to a receiver in such a manner that, with a liquid chlorosilane sample in the sample container, when the system was pressurized with argon the chlorosilane would flow up the dip tube, enter the top of an adsorbant filled column, pass through the column, and exit to the receiver. The adsorbant column contained amorphous silica (Cabosil S-17, from Cabot Corporation, Boston, Mass.) especially selected for its low level of boron. The silica was first treated with hydrogen fluoride by passing argon over about 100 mg of a Ultrex 48% HF aqueous solution (from J. T. Baker, Phillipsburg, N.J.) and then through the column (containing about 75 mg silica). The argon, containing HF vapor, was passed through the silica at a rate of 75-150 ml/min for 45 minutes. After purging with argon, the fluorinated column contained approximately 0.5% fluorine. For the actual analysis the effluent chlorosilane was placed in the sample container. The sample container was pressurized with welding grade argon to provide a liquid elution rate of about 50 ml of chlorosilane per hour through the fluorinated amorphous silica column. After elution was complete, argon was allowed to flow through the analytical column at a rate of about 75-150 ml/hr for about 45 minutes. The concentration of boron adsorbed on the analytical column was then determined by Atomic Emission Spectrography. The analytical column was, in effect, employed to concentrate the boron containing impurities present in the effluent. Therefore, boron detection limits depend for the most part on the amount of effluent passed through the analytical column. The amount of boron in the effluent was determined by the following calculation:

$$\frac{\text{Concentration of Boron in Column (ppm)} \times \text{Column Wt} \times F}{\text{Sample Wt}}$$

where "concentration of boron in column (ppm)" is the concentration (in parts per million) of boron adsorbed on the analytical column, "column wt" is the weight of material in the analytical column, "sample wt" is the weight of effluent chlorosilane passed through the analytical column, and "F" is a factor to convert ppm (by weight) to the desired ppba (part per billion atomic) boron. For trichlorosilane F approximately equals (1000 (135.5))/10.8 where 135.5 is the molecular weight of trichlorosilane and 10.8 is the atomic weight of boron.

In Comparative Examples 1-3 the analytical column was actually incorporated directly into the experimental system. In these examples the liquid chlorosilane passed first through the test columns and then directly into the analytical column. The analytical column was removed periodically to determine the boron content of the effluent.

EXAMPLE 1

This example shows the vapor phase adsorption of boron-containing impurities from trichlorosilane. The trichlorosilane employed contained about 7900 ppba boron. The silica employed was from Davidson Chemical Div., W. R. Grace and Co., Baltimore, Md. The Grade 12 silica had a free water content of about 4%, a particle size of 28-200 mesh, a bulk density of about 46 lbs/ft$^3$, a surface area of about 720-760 m$^2$/g, and a pore volume of about 0.4 cc/g. The particle size distribution of the silica was as follows: 6% retained on a 28 mesh screen, 50% retained on a 65 mesh screen, 85% retained on a 150 mesh screen, and 94% retained on a 200 mesh screen. Except for the water content, all data on the silica was supplied by the vendor.

The apparatus employed was constructed of stainless steel except for the collection bottle which was Teflon. The chlorosilane contaminated with boron impurities was loaded into a feed tank under a nitrogen atmosphere. The flow rate of the chlorosilane through the system was controlled by varying the nitrogen pressure above the chlorosilane liquid in the feed tank. The liquid chlorosilane, upon leaving the feed tank, passed through a rotameter where the flow rate of the liquid chlorosilane was monitored. After the rotameter the liquid chlorosilane is passed into a coiled vaporizer heated with steam at a pressure of about 10 pounds. Sufficient steam is used in the vaporizer to insure that all the chlorosilane is vaporized. The chlorosilane vapor is then passed into the test column containing the silica adsorbant. The line between the vaporizer and the test column and the test column itself are heat traced and carefully kept at a specified temperature above the boiling point of the chlorosilane. After passage through the test column the chlorosilane vapor was condensed at dry ice temperature and collected in a Teflon container also cooled with dry ice. The material collected was then analyzed for boron content. Generally several chlorosilane samples were collected through the course of a run and analyzed for boron for the evaluation of a given silica.

In a blank experiment, trichlorosilane containing about 7900 ppba boron was passed through this system in the absence of an adsorbant material in the test column. The temperature of the test column was 50° C.

The collected trichlorosilane was found to have about 3600 ppba boron.

Davidson Grade 12 silica (456 mg) was placed in the test column. The fixed bed of silica was about 1 inch thick. Trichlorosilane containing about 7900 ppba boron was fed to the vaporizer at a liquid flowrate of about 1.34 g/min. Vapor trichlorosilane passed through the test column at a rate of about 27 ft/min with a residence time of about 0.2 sec. The temperature of the test column was 50° C. The pressure drop across the bed was about 0 psig. A total of 482 g trichlorosilane vapor was passed through the silica fixed bed. Boron was not detected in any of the effluent (detection limit was based on the $HSiCl_3$ sample size and was about 60 ppba). The capacity of this silica column was greater than 1060 g $HSiCl_3$/g $SiO_2$. Greater than 99.2% of the boron was removed by passage through the column. Boron "breakthrough" was not observed.

A comparison of the blank experiment and the experiment containing Grade 12 silica clearly shows that the reduction of boron impurities noted here and elsewhere in the examples is due to the silica rather than the mere vaporization and condensing of the chlorosilane.

EXAMPLE 2

This example also shows the vapor phase adsorption of boron impurities from trichlorosilane. The apparatus described in Example 1 was employed. The trichlorosilane feed (containing about 7900 ppba boron) and the silica (Davidson Grade 12) used were the same as used in Example 1. About 785 mg of silica was placed in the test column. Trichlorosilane (397 g) was then passed through the system at a liquid flow rate of 0.36 cc/min resulting in a vapor residence time of about 0.9 sec in the silica fixed bed. The temperature of the fixed bed was 50° C. The pressure drop across the fixed bed was about 0 psig. Boron was not detected in the effluent (detection limit about 30 ppba). The capacity of the silica for trichlorosilane purification was greather than 506 g $HSiCl_3$/g $SiO_2$ and boron removal was greater than 99.6%. Boron "breakthrough" was not observed.

EXAMPLE 3

Using the same system and similar materials as described in Example 1, trichlorosilane containing 3500 ppba boron was purified by vapor phase adsorption at 50° C. using Davidson Grade 12 silica. The test column contained 466 mg $SiO_2$. The vapor residence time in the column was 0.2 sec. After a total of 944 g $HSiCl_3$ was purified the effluent still had an undetectable amount (less than 50 ppba) of boron. The capacity of this silica was greater than 2025 g $HSiCl_3$/g $SiO_2$ with boron removal at greater than 98.6%.

COMPARATIVE EXAMPLE 1

This example shows the liquid phase adsorption of boron impurities from trichlorosilane using a Davidson Grade 12 silica. The free water content of the silica was about 4%. The apparatus was constructed of stainless steel and Teflon. The chlorosilane was loaded into a feed tank connected to a nitrogen line. By variation of the nitrogen pressure the chlorosilane flow rate was controlled. From the feed tank the chlorosilane passed into three Teflon test columns (¼" ID by 2" long) mounted in series which contained the silica to be tested. After passage of the chlorosilane through the test columns, it flowed through an analytical column and then into a product recovery container. The analytical column contained about 100 mg of HF treated Cabosil S-17 amorphous silica. The analytical column was removed frequently to analyze for the boron content of the effluent. A new analytical column was used after each boron analysis.

The trichlorosilane feed contained 7650 ppba boron. Each test column contained about 1 g silica for a total of 3.19 g silica. The system operated at ambient temperature (about 22° C.). After passage of 662 g $HSiCl_3$ through the system the boron content of the effluent was still below the detection limit (ca. 90 ppba). The passage of an additional 189 g $HSiCl_3$ resulted in an effluent containing 126 ppba boron. A further 214 g of $HSiCl_3$ resulted in an effluent with 740 ppba boron level. The "breakthrough" capacity of this silica in the liquid phase adsorption study was about 270–330 g $HSiCl_3$/g $SiO_2$ with more than 98.8% of the boron removed prior to "breakthrough".

A comparison of Example 1, 2, and 3 with Comparative Example 1 clearly shows the superior performance obtained with vapor phase adsorption.

EXAMPLE 4

This example demonstrates the purification of a relatively pure sample of trichlorosilane using vapor phase adsorption with a silica fixed bed. The apparatus used is described in Example 1. The feed trichlorosilane contained 410 ppba boron. The silica (466 mg) was Davidson Grade 12. The temperature of the column was 50° C. The vapor velocity in the silica column was about 27 ft/min. The pressure drop across the fixed bed was about 0 psig. After passage of 590 g $HSiCl_3$ through the column the effluent had a undetectable boron level. The detection limit was ca. 40 ppba. The capacity of the silica for boron removal from the relatively pure trichlorosilane was greater than 1266 g $HSiCl_3$/g $SiO_2$. More than 90% of the boron impurities were removed.

COMPARATIVE EXAMPLE 2

This example demonstrates the attempted purification of a relatively pure sample of trichlorosilane using liquid phase adsorption with a silica fixed bed. The trichlorosilane sample contained 455 ppba boron. The silica (2.99 g) was Davidson Grade 12. The flow rate of trichlorosilane through the system was about 1 cc/min. The temperature of the system was about 22° C. The first boron determination was taken after passage of 402 g $HSiCl_3$ through the fixed bed. The effluent contained 187 ppba boron. Therefore the capacity of the liquid phase adsorption system for purification of relatively pure $HSiCl_3$ was less than 134 g $HSiCl_3$/g $SiO_2$ with only about 60% boron removal.

A comparison of Example 4 and Comparative Example 2 clearly shows the superiority of the vapor phase adsorption technique.

EXAMPLE 5

This Example shows the purification of trichlorosilane by the vapor phase adsorption procedure using a different silica as the adsorbant. The silica employed was Sipernat 22 (from Degussa Corp., Teterboro, N.J.) with a surface area of about 190 $m^2$/g, an average particle size of 18 microns, a bulk density of about 200 g/l, and a free water content when shipped from the manufacturer of about 6%. The apparatus and procedures described in Example 1 were employed. Silica (300 mg) was loaded into the test column. The temperature of the test column was 50° C. The crude trichlorosilane contained 5700 ppba boron. The vapor flow through the test column was 13 ft/min. The vapor residence time in the column was about 0.8 sec. After passage of 299 g HSiCl$_3$ through the column the resulting effluent contained 56 ppba boron. Another 170 g of HSiCl$_3$ vapor was passed through the column with the effluent containing 49 ppba boron. The pressure drop across the column (about 2" long) was about 80 psig/ft. The capacity of the adsorbant was greater than 1560 g HSiCl$_3$/g SiO$_2$ with about 99.1% of the boron removed.

In a similar experiment a fresh sample of Degussa Sipernat 22 silica (265 mg) was employed under the same experimental conditions as above except that the vapor residence time in the silica column was increased to about 1.3 sec. After passage of about 290 g of the same crude trichlorosilane (5700 ppba boron) the effluent contained no detectable boron (less than 30 ppba). The capacity of this silica for boron removal was greater than 1094 g HSiCl$_3$/g SiO$_2$ with about 99.5% of the boron removed. The pressure drop across the column was about 30 psig/ft.

COMPARATIVE EXAMPLE 3

This example shows the purification of trichlorosilane by liquid phase adsorption using Degussa Sipernat 22 silica. The procedures and apparatus employed were the same as described in Comparative Example 1. The silica (245 mg) is described in Example 5. Liquid trichlorosilane (8024 ppba boron) was passed through the silica column at a rate of about 1.2 cc/min and ambient temperature (22° C.). The effluent, after passage of 166 g of trichlorosilane, contained 517 ppba boron. The capacity of the silica column was less than 678 g HSiCl$_3$/g SiO$_2$ with about 94% boron removal.

An inspection of Example 5 and Comparative Example 3 clearly shows the superiority of the vapor phase adsorption over liquid phase adsorption using Degussa Sipernat 22 silica as the adsorbent.

Examples 6 and 7 demonstrate the practice of this invention on a "mini-plant" scale. Liquid trichlorosilane was fed into the system through a rotameter. From the rotameter the liquid trichlorosilane passed into the vaporizer. The vaporizer, constructed of carbon steel, consisted of a jacket of about 4" diameter and 2' length containing about 26' of ¼" stainless steel line in a coiled configuration. Through the coiled line passed 30 pound steam resulting in the vaporizer being operated at about 120° C. The trichlorosilane vapor was then transported to the fixed bed adsorption unit through heat traced (about 70° C.) carbon steel lines. The fixed bed adsorption unit was constructed of carbon steel with a length of 12" and a diameter of 3". Three 350 watt tubular heaters were mounted on the outside of the adsorption unit. The silica was contained in the adsorption unit by means of a 325 mesh stainless steel screen mounted on a support plate. From the adsorption unit, the vaporous trichlorosilane was passed into a sample cooler which was cooled with service water (about 25° C.). The condensed trichlorosilane was then collected.

EXAMPLE 6

This example shows the effect of temperature on the adsorption process using the "mini-plant" system just described. Davidson Grade 12 silica containing 2% by weight free water and 3.0% total hydroxyl was employed. In each run the adsorption unit was loaded with 2.25 lbs silica. The crude trichlorosilane contained about 8000 ppba boron. The flow rate of trichlorosilane through the system was 35 lbs/hr. The pressure drop across the fixed bed was in the range of 2–4 psig for all runs. In Run 1, the adsorption unit was at an average temperature of 85° C. with a temperature range of 73°–99° C. In Run 2 the average temperature of the silica gel bed was 74° C. with a range of 63°–85° C. In Run 3 the average temperature was 62° C. with a temperature range of 59°–64° C. In Run 1, after passage of 400 lbs HSiCl$_3$/lb SiO$_2$ the effluent contained 380 ppba boron. Therefore, at an average temperature of 85° C. the capacity of the fixed bed was less than 400 lbs HSiCl$_3$/lb SiO$_2$ with boron removal at about 95%. In Run 2, after passage of 400 lbs HSiCl$_3$/lb SiO$_2$ the effluent contained 15 ppba boron; after 1485 lbs HSiCl$_3$/lb SiO$_2$ the effluent contained 85 ppba boron; and after treating 1950 lbs HSiCl$_3$/lb SiO$_2$ the effluent contained 3000 ppba boron. Therefore, at a operating temperature of about 74° C. the capacity of the silica for purifying trichlorosilane was between 1485 and 1950 lbs HSiCl$_3$/lb SiO$_2$ with about 98.9% boron removal. In Run 3, after passage of 500 lbs HSiCl$_3$/lb SiO$_2$ through the silica bed the effluent contained less than 15 ppba boron; after 1000 lbs HSiCl$_3$/lb SiO$_2$, 15 ppba boron; and after 1530 lbs HSiCl$_3$/lb SiO$_2$ was passed through the silica fixed bed the effluent contained only 60 ppba. Therefore, at a temperature of about 62° C. the silica capacity for boron adsorption was greater than 1500 lbs HSiCl$_3$/lb SiO$_2$ with about 99.2% of the boron removed.

Based on these results, it is preferred that the temperature of the fixed bed adsorption unit remain below an average temperature of about 85° C. in order to obtain maximum capacities and efficiencies in boron removal from trichlorosilane.

EXAMPLE 7

This example shows the quality of polycrystalline silicon that can be produced from trichlorosilane purified by the procedures of this invention. The "mini-plant" vapor phase adsorption system was employed. In Run 1, 2.25 lbs of Davidson Grade 12 silica (as employed in Example 6) was used in the fixed bed. The adsorption unit was kept at an average temperature of 70° C. (range: 66°–75° C.). Trichlorosilane containing about 2700 ppba boron was passed through the fixed bed at a flowrate of 35 lbs/hr. The pressure drop through the bed was 4 psig. At a capacity of 1440 lbs HSiCl$_3$/lb SiO$_2$ the effluent contained no detectable boron (detection limit was 14 ppba boron). Polycrystalline silicon, prepared by standard hydrogen reduction techniques using the effluent trichlorosilane without any additional purification, contained 0.20 ppba boron. One skilled in the art would know that polycrystalline silicon prepared from the crude trichlorosilane used in Run 1 without any purification would probably contain in excess of 1000 ppba boron.

In Run 2, 2.25 lbs of a different lot of Davidson Grade 12 silica was employed in the adsorption unit. This silica contained nil free water and about 1.0% total hydroxyl. The crude trichlorosilane contained about 100 ppba boron and was passed through the fixed silica bed at a temperature of between 63° and 71° C. and at a flowrate of 34.0 lbs/hr. The capacity of this silica was greater than 1080 lb HSiCl$_3$/g SiO$_2$ with boron at less than 20 ppba in the effluent. Polycrystalline silicon prepared from this effluent (with no further purification) contained 0.03 ppba boron. It is estimated that polycrystalline silicon prepared from trichlorosilane with 100 ppba boron would have contained 10–20 ppba or more boron.

That which is claimed:

1. A process for purification of a chlorosilane selected from the group consisting of monochlorosilane, dichlorosilane, trichlorosilane, and tetrachlorosilane where said chlorosilane is contaminated with boron-containing impurities, said process comprising the steps of
   (A) passing the chlorosilane, in the vapor phase, through a bed of silica, said bed of silica consisting of silica containing about 0 to 10% by weight free water and more than about about 0.25% by weight total hydroxyl, said bed of silica being at a temperature greater than 3° C. above the boiling point of the chlorosilane at the operating pressure of step (A) and a temperature of less than or equal to about 99° C., and
   (B) collecting the purified chlorosilane having a significantly reduced amount of the boron-containing impurities.

2. A process as defined in claim 1 wherein the silica contains more than about 10% total hydroxyl and wherein the temperature of the bed of silica is less than 85° C.

3. A process as defined in claim 1 wherein the chlorosilane, in the vapor phase, is passed through a fixed bed of silica in an adsorption column.

4. A process as defined in claim 2 wherein the chlorosilane, in the vapor phase, is passed through a fixed bed of silica in an adsorption column.

5. A process as defined in claim 3 wherein the chlorosilane is dichlorosilane.

6. A process as defined in claim 3 wherein the chlorosilane is trichlorosilane.

7. A process as defined in claim 4. wherein the chlorosilane is trichlorosilane.

8. A process as defined in claim 7 wherein the temperature of the fixed bed of silica is between 50° C. and 75° C.

9. A process as defined in claim 5 wherein the chlorosilane is also purified by distillation.

10. A process as defined in claim 6 wherein the chlorosilane is also purified by distillation.

11. A process as defined in claim 7 wherein the chlorosilane is also purified by distillation.

12. A process as defined in claim 7 wherein at least 90% of the boron-containing impurities are removed from the chlorosilane and where the purified chlorosilane contains less than 100 ppba boron.

13. A process as defined in claim 8 wherein at least 90% of the boron-containing impurities are removed from the chlorosilane and where the purified chlorosilane contains less than 100 ppba boron.

14. A process as defined in claim 12 wherein the purified chlorosilane contains less than 50 ppba boron.

15. A process as defined in claim 13 wherein the purified chlorosilane contains less than 50 ppba boron.

16. A process as defined in claim 7 wherein the trichlorosilane to be purified is produced from the direct process reaction of silicon metal and hydrogen chloride.

17. A process as defined in claim 13 wherein the trichlorosilane to be purified is produced from the direct process reaction of silicon metal and hydrogen chloride.

18. A process for the purification of trichlorosilane where said trichlorosilane is contaminated with boron-containing impurities, said process comprising the steps of
   (A) passing the trichlorosilane, in the vapor phase, through as bed of silica, said bed of silica consisting of silica containing about 0 to 10% by weight free water and more than about 0.25% by weight total hydroxyl, said bed of silica being at a temperature greater than 3° C. above the boiling point of trichlorosilane at the operating pressure of step (A) and at a temperature of less than 85° C., said silica has a surface area greater than about 500 m$^2$/g, and said silica has a particle size distribution such that about 35–65% of the particles are retained on a 65 mesh screen, and
   (B) collecting the purified chlorosilane.

19. A process as defined in claim 18 wherein the temperature of the silica bed is between 50° C. and 75° C. and wherein the silica contains more than about 1.0% total hydroxyl.

20. A process as defined in claim 19 wherein the trichlorosilane to be purified is produced from the direct process reaction of silicon metal and hydrogen chloride, wherein at least 90% of the boron-containing impurities are removed from the trichlorosilane contains less than 100 ppba boron.

* * * * *